(12) United States Patent
Käsbauer et al.

(10) Patent No.: US 6,842,688 B2
(45) Date of Patent: Jan. 11, 2005

(54) ADAPTIVE CONTROL METHOD (75) Inventors: Michael Käsbauer, Neutraubling (DE); Wolfgang Stadler, Ergoldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/797,454

(22) Filed: Mar. 10, 2004

(65) Prior Publication Data

US 2004/0193357 A1 Sep. 30, 2004

Related U.S. Application Data (63) Continuation of application No. PCT/DE02/03348, filed on Sep. 9, 2002.

(30) Foreign Application Priority Data

Sep. 10, 2001 (DE) ........................................ 101 44 337

(51) Int. Cl.$^7$ ............................................. F02D 41/14
(52) U.S. Cl. ...................... 701/108; 701/109; 701/114; 123/568.21
(58) Field of Search ............................... 701/108, 109, 701/102, 115, 114; 123/568.16, 568.21, 568.23, 568.24

(56) References Cited

U.S. PATENT DOCUMENTS

| 5,690,083 A | 11/1997 | Gopp et al. | 123/571 |
| 6,415,779 B1 * | 7/2002 | Colomby | 701/109 |
| 2004/0148087 A1 * | 7/2004 | Lange et al. | 701/108 |

FOREIGN PATENT DOCUMENTS

| DE | 197 49 056 A1 | 5/1999 | ........... G05B/11/36 |
| DE | 198 34 477 A1 | 11/1999 | ........... G05B/11/01 |
| JP | 07141002 | 6/1995 | ........... G05B/11/36 |
| JP | 11194825 | 7/1999 | ............ G05D/3/00 |

* cited by examiner

Primary Examiner—Hieu T. Vo
(74) Attorney, Agent, or Firm—Baker Botts L.L.P.

(57) ABSTRACT

In a control method, the setting for a setting device (5), comprising a device (9) for reporting the setting, is regulated in a range between two end positions by using a measured parameter, given by the device (9) for reporting the setting, depending on the setting of the setting device and a characteristic curve, whereby, during the regulation a set value or an actual value for the setting is monitored. The characteristic curve is adapted when the set value or the actual value for the setting lies within a given separation from a given value for an adaptation setting.

17 Claims, 5 Drawing Sheets

ADAPTIVE CONTROL METHOD

CROSS REFERENCE TO RELATED APPLICATION

This application is a continuation of copending International Application No. PCT/DE02/03348 filed Sep. 9, 2002 which designates the United States, and claims priority to German application no. 101 44 337.4 filed Sep. 10, 2001.

TECHNICAL FIELD OF THE INVENTION

The invention relates to a control method in which the setting for a setting device, comprising a device for reporting the setting, is regulated in a range between two end positions by using a measured parameter, given by the device for reporting the setting depending on the setting of the setting device, and a characteristic curve, whereby an actual value for the setting is assigned to each value of the measured parameter, in order to reach a set value.

DESCRIPTION OF THE RELATED ART

Control methods of such a kind are already known and can be used in many areas.

For example it is conceivable for such a method to be used in the exhaust gas recirculation of an internal combustion engine. By recirculating the exhaust gas of an internal combustion engine to its air intake it is possible to reduce the peak combustion temperature in the internal combustion engine, and thereby also reduce the NOx content of the exhaust gas. For this purpose the exhaust gas return flow is controlled by a control device for controlling the internal combustion engine by means of an exhaust gas recirculation valve. The exhaust gas recirculation valve, acting as a setting device, can comprise a rotatable flap which can be used to close the exhaust gas recirculation duct partially or fully. As a device for reporting the setting, a rotary rheostat which can be rotated by the flap can be provided with an electrical circuit which outputs a signal reproducing the voltage drop on the rotary rheostat. Then if the resistance in the rotary rheostat exhibits linear dependence on the angle of rotation, the resulting characteristic curve is a straight line, which means that capturing the voltage on the rotary rheostat makes it an easy matter to alter the angle of rotation and so adjust the setting of the flap. With such an arrangement the setting of the exhaust gas recirculation valve and the flap in particular could therefore be regulated by means of a control method of this kind.

Whilst the internal combustion engine is running, however, control accuracy may alter due to a change in the device for reporting the setting caused for instance by a change of temperature in the rotary rheostat, or due to a change in the mechanical setting elements caused possibly by contamination of the flap or of the exhaust gas recirculation duct. As a result of this the quality of the exhaust emission control may be reduced and standards for exhaust gas emission may not be met.

If movement of the flap is restricted by mechanical stops at the end positions, continuing control on the basis of a characteristic curve which is no longer valid can lead to a situation in which the flap drive motor, when controlling an end position which is no longer correctly definable, will press the flap against the stop and thereby be exposed to unnecessarily high current, causing the service life of the motor to be reduced.

SUMMARY OF THE INVENTION

The object of the invention is to provide a control method of the type mentioned above that makes it possible to improve the reliability of regulation during operation.

In the case of such a control method this object is achieved in that during regulation the set value or the actual value for the setting is monitored, and in that when the set value or the actual value for the setting lies within a given separation from a given value for an adaptation setting, the characteristic curve is adapted by interrupting regulation, driving the setting device to the adaptation setting, in the adaptation setting capturing a value of the measured parameter from the device for reporting the setting and using this value to define an adaptation value, and adapting the characteristic curve by using the adaptation value and the adaptation setting. The regulation is then resumed.

Adapting the characteristic curve using the method to which the invention relates makes it possible to ensure that changes to the setting device which result in changes to the actual assignment of the value for the adaptation setting and of the value of the measured parameter captured in this position are taken into consideration by adapting the characteristic curve whilst control is in progress. This ensures greater reliability in controlling the position of the setting device.

In the method to which the invention relates, regulation is interrupted for the purpose of adaptation and the setting device is driven to the given adaptation setting. A certain minimum time is needed for this, and the longer it is the further the actual value of the setting device lies from the adaptation setting. Advantageously for the purpose of achieving an especially fast adaptation which only slightly affects control, the set value or actual value for the setting is therefore monitored during regulation, and the latter is only interrupted for adaptation when the position of the setting device is close to the adaptation setting and can therefore be driven quickly into position.

In the method to which the invention relates, the actual value for the setting or the set value for the setting can be monitored. Monitoring the actual value of the setting also means in particular direct monitoring of the corresponding measured parameter value captured by the device for reporting the setting. In this case, checking whether the actual value for the setting lies within a given separation from the given value for the adaptation setting can be carried out by checking whether a measured parameter value captured by the device for reporting the setting lies within a corresponding separation from the measured parameter value assigned to the value for the adaptation setting corresponding to the characteristic curve.

According to the invention, adaptation can be carried out when the set value or actual value for the setting lies within a given separation from a given value for the adaptation setting. However, adaptation is not always necessary every time such a setting is reached. It is therefore preferable that during regulation the fulfillment of at least one further condition relating to the regulation should be monitored, and the characteristic curve should only be adapted when the further condition is fulfilled. This makes it possible to achieve a situation in which the regulation is only interrupted when an adaptation appears necessary.

A possible further condition which is particularly preferable is that once an adaptation has been carried out a given minimum time must elapse before the next adaptation can take place. In particular this makes it possible to ensure that despite a chance control situation in which the set setting of the setting device lies close to the adaptation setting, the regulation is not unnecessarily interrupted in order to carry out an adaptation. This keeps adverse effects on overall control behavior to a minimum.

Alternatively or in addition, the change in the set setting or actual setting over time can be monitored, and adaptation of the characteristic curve is then only carried out if the length of time over which the set or actual setting changes falls below a maximum value. Monitoring the length of time over which the setting or the value for the setting changes, which equates to monitoring the rate of change of the set or actual setting, avoids carrying out an adaptation in a situation where, as indicated by the rapid change in the set or actual value, regulation is particularly necessary and accordingly any interruption to the regulation would lead to a malfunction.

The acquisition of measured parameter values for adaptation should only take place when the setting device has reached the planned adaptation setting. In addition an adaptation that has been started can be aborted if one or more of the adaptation conditions is no longer fulfilled. The value that was last valid or a substitute value can then be used.

Advantageously, whilst the adaptation setting is being controlled the value of the measured parameter can be monitored to see whether a stationary state has been reached, and if this is the case the acquisition of values for the actual adaptation can be started.

It would be a particular advantage if the adaptation setting used for adaptation were selected so that it can be controlled without using the measured parameter values captured by the device for reporting the setting, since the adaptation setting can then be controlled with greater reliability.

It is therefore preferable to use a setting device that is designed so that its setting cannot be changed beyond at least one of the end positions, and so that this end position of the setting device is used as the adaptation setting. For instance a mechanical setting device for limiting movement can comprise a stop that prevents the setting device from moving beyond the end position. On the other hand it is also possible for the end position to be defined by using a design for the setting device which imposes limits on electrical parameters, such as the maximum hold currents that may be applied.

It is also preferable for the value of the measured parameter to be acquired after a given length of time following an interruption to the regulation, i.e. after adaptation has started. For preference this length of time is selected so that at the usual setting speeds the adaptation setting is reached with certainty when the setting device is located at the start of the adaptation in the range provided for triggering adaptation.

In a particularly simple and therefore preferred case, in which the setting device comprises an electrically operated driving device, the point at which the adaptation setting is reached can be determined by monitoring the current consumption of the driving device. This is especially possible when the adaptation setting lies at an end position which is provided with a stop that mechanically prevents the setting device from changing to a setting beyond the stop. This provides a particularly simple method for checking when the adaptation setting has been reached.

The characteristic curve can preferably be represented as a function which can be allocated parameters by one or two pairs of mutually assigned adaptation values of the measured parameter and the value for the adaptation setting corresponding to the adaptation value of the measured parameter, so that only one or two adaptation settings need be controlled for a complete adaptation. Although the adaptation settings can in principle be any suitable setting between the end positions, it is especially preferable for the function to be chosen so that the characteristic curve can be fully adapted by adaptation at the end positions. In particular the function can be linear, i.e. a linear equation. However, characteristic curves of a higher order are generally also possible.

The adaptation value of the measured parameter can be determined in a multiplicity of ways. In the simplest case the captured value of the measured parameter is used directly. Depending on the application, however, suitable filtering processes are also conceivable.

In a preferred development of the control method to which the invention relates, the measured parameter value captured in the adaptation setting is subjected to a plausibility check and if an implausible value is detected a signal to that effect is sent to a diagnostic device. With this development not only is the characteristic curve adapted for improved regulation, but also at the same time the plausibility check enables error diagnostics to be carried out on the setting device. In particular it is possible to ensure that if errors occur in the setting device and reveal themselves as implausible measured parameter values, it is then possible to output appropriate warning signals or execute emergency programs or routines. Furthermore it becomes a simple matter to identify the setting device as a source of errors.

It is especially preferable that the plausibility check should also examine whether the measured parameter value captured in the adaptation setting lies within a given value range. This range may be among other things a manufacturer's recommended tolerance range, within which values captured from the measured parameter and relating to the adaptation setting are to be regarded as error-free. If the value lies outside this range an error must be assumed, resulting in an appropriate signal being sent to a diagnostic device.

It is also particularly preferable that if implausible measured parameter values are detected during adaptation, a given substitute value should be used instead of the captured value of the measured parameter. In this way, once the adaptation is complete the control method can continue with the aid of the substitute value, ensuring that the regulation still maintains a certain minimum level of functionality even if an error occurs.

In another particular preference, adaptation values from a plurality of executions of the characteristic curve adaptation can be used to diagnose errors. In particular, consecutive adaptation values of the measured parameter corresponding to the same adaptation setting are examined for long-term drift. If long-term drift is detected, appropriate diagnostic signals can be sent to a diagnostic or similar device.

In the method to which the invention relates, once the adaptation setting has been reached the measured parameter value is captured at least once and used in order to determine the adaptation value. The measured parameter values captured in the adaptation setting may fluctuate, however, for instance due to statistical errors when the device for reporting errors is capturing the measured parameter, and this would reduce the accuracy of the adaptation. It is therefore preferable that the value of the measured parameter in the adaptation setting should be measured a plurality of times and the adaptation value of the measured parameter should be formed by a low pass filtering process. In particular a floating average or a weighted floating average can be used as a filter for this purpose.

Once the adaptation is complete the regulation to which the invention relates is resumed. Preferably at this point an integrating element of the control method is reinitialized. In this way it is possible to ensure that the interruption to the regulation does not cause the integrating element to accept incorrect values, such as might occur in the case of a PID controller.

It is especially preferable for the method to which the invention relates to be used for controlling the setting of an exhaust gas recirculation valve on an internal combustion engine, in such a way that the setting device extends to the exhaust gas recirculation valve. It then becomes possible to adapt the characteristic curve so as to compensate for changes in the setting device caused for instance by contamination or temperature changes, or to detect errors in the setting device.

However, other applications are conceivable, such as in throttle controls, turbocharger wastegates, turbochargers with variable turbine geometry or sliding-collar superchargers, electromechanical valve drives, window or windshield wiper drives, as well as in non-automotive devices such as machine tools or similar.

A further object of the invention is a control device developed to execute the control method to which the invention relates. This can be carried out by an appropriate digital circuit or software driven by the control device.

BRIEF DESCRIPTION OF THE DRAWINGS

The invention will be described in further detail in relation to the drawings attached. These are.

DETAILED DESCRIPTION OF THE PREFERRED EMBODIMENTS

Figure 1:
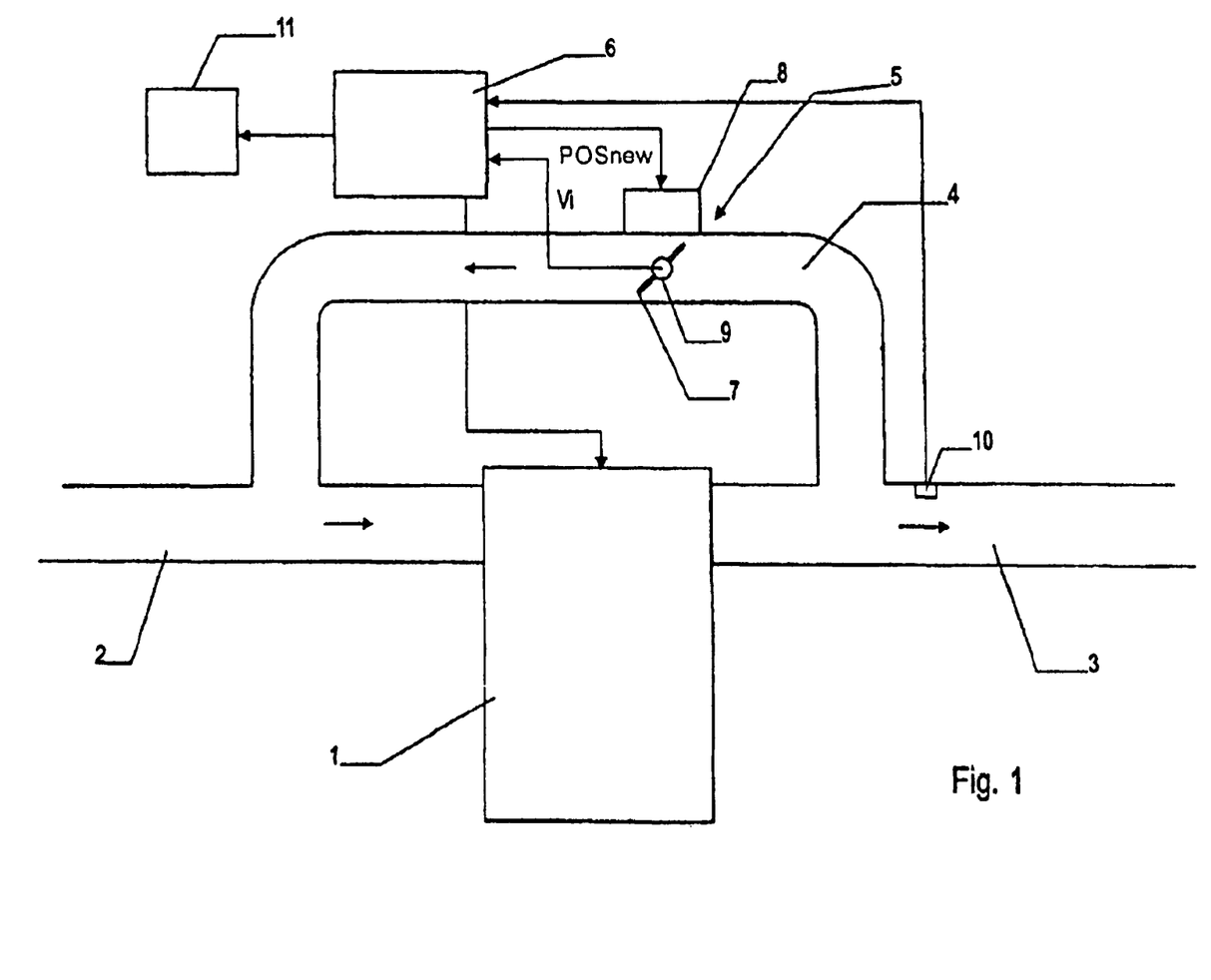
FIG. 1 A diagrammatic representation of an internal combustion engine with an exhaust gas recirculation duct and a control device according to a preferred embodiment of the invention, FIG. 2 A diagrammatic representation of the characteristic curve of a rotary rheostat in the exhaust gas recirculation duct in FIG. 1 and FIGS. 3A, 3B and 3C A flow chart of a control method for the exhaust gas valve in the internal combustion engine in FIG. 1 according to a preferred embodiment of the invention.

In FIG. 1 air for the combustion of fuel is fed to an internal combustion engine 1 through an air intake 2. The exhaust gases created by the combustion of fuel in the internal combustion engine 1 are led away through an exhaust gas duct 3. Exhaust gases can be fed to the air intake 2 through an exhaust gas recirculation duct 4 in order to reduce the peak combustion temperature in the internal combustion engine 1 and thereby reduce the NOx content of the exhaust gases.

To control the recirculated exhaust gas stream an exhaust gas recirculation valve 5 is provided, the setting of this valve being regulated with the aid of a control device 6 which also, as indicated by an arrow in FIG. 1, controls the internal combustion engine 1 by a known method. To this end the internal combustion engine is provided not only with known sensors, not shown in FIG. 1, which capture operating parameters from the internal combustion engine 1 and feed them to the control device 6, but also with setting elements, also not shown in FIG. 1, which are controlled by the control device 6.

The exhaust gas recirculation valve 5 comprises a rotatable, pivoted flap 7 which can be used to close the exhaust gas recirculation duct 4 partially or fully. The setting of the flap 7 can be changed by a servomotor 8, the movement of which, as indicated in FIG. 1 by an arrow, can be controlled by the control device 6. Two stops not shown in FIG. 1 are provided in order to ensure that the flap can only be moved through an angle of 90° between a vertical end position, in which the exhaust gas recirculation duct 4 is completely closed, and a horizontal end position, in which the exhaust gas recirculation duct 4 is completely open. The vertical end position and the corresponding stop will from now on be called the right end position or right stop, and the horizontal end position and the corresponding stop will be called the left end position or left stop.

A device for reporting the setting is formed by a rotary rheostat 9 and a circuit in the control device, not shown in FIG. 1, which outputs a voltage V dropped at the resistor in the rotary rheostat. The rotary rheostat 9 can be rotated with the aid of a shaft which also moves the flap 7, thereby changing its resistance depending on the angle of rotation. The actual position of the flap 7 can therefore be determined by the voltage drop at the rotary rheostat 9.

Figure 2:
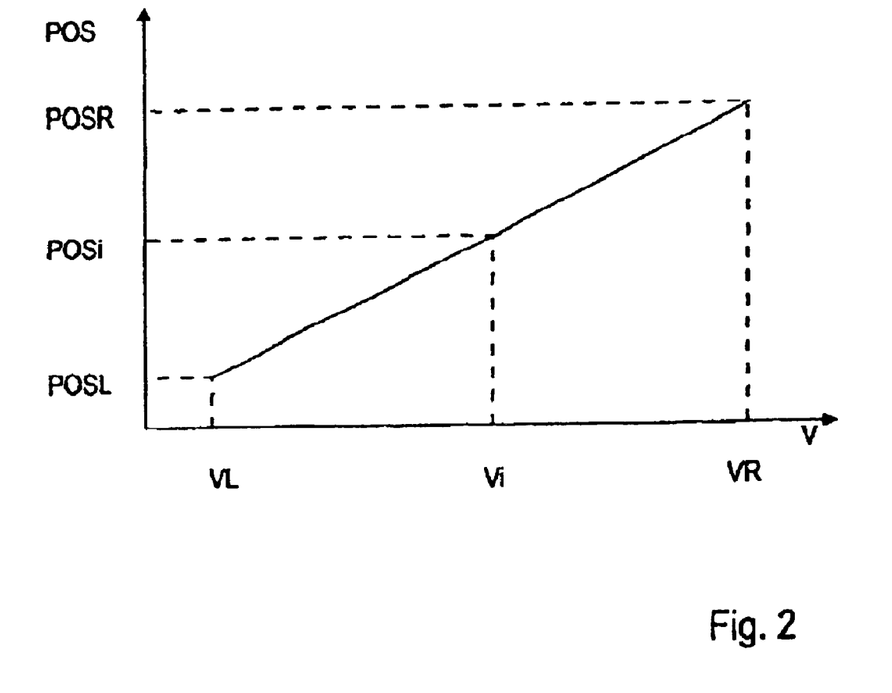

The characteristic curve shown in FIG. 2 is used for this purpose, and represents a relationship between the angular settings POS of the flap 7 and the voltage values V qualitatively, so that information about the scaling and units on the axes is not necessary. The flap 7 is continuously adjustable between the left and right end positions POSL and POSR, to which voltage values VL and VR are assigned respectively. Since the functional form of the characteristic curve is given by a straight line, the characteristic curve can be defined simply by specifying the value pairs (VL, POSL) and (VR, POSR) at the end points. In particular the characteristic curve can be represented by the linear equation for the setting POS as a function of the voltage value V $$POS=(POSR-POSL)/(VR-VL)\ (V-VL)+POSL$$

Furthermore the exhaust gas duct 3 contains a temperature sensor 10 which captures the exhaust gas temperature and outputs signals corresponding to the captured temperature to the control device 6.

Lastly the control device 6 is linked to a diagnostic system 11 which serves to capture sensors and launch appropriate measures.

In a preferred embodiment of the control method to which the invention relates, the setting of the flap 7 is regulated by a program running in the control device 6. The control method is represented diagrammatically in FIGS. 3A, 3B and 3C in the form of a flow chart.

Figure 3A:
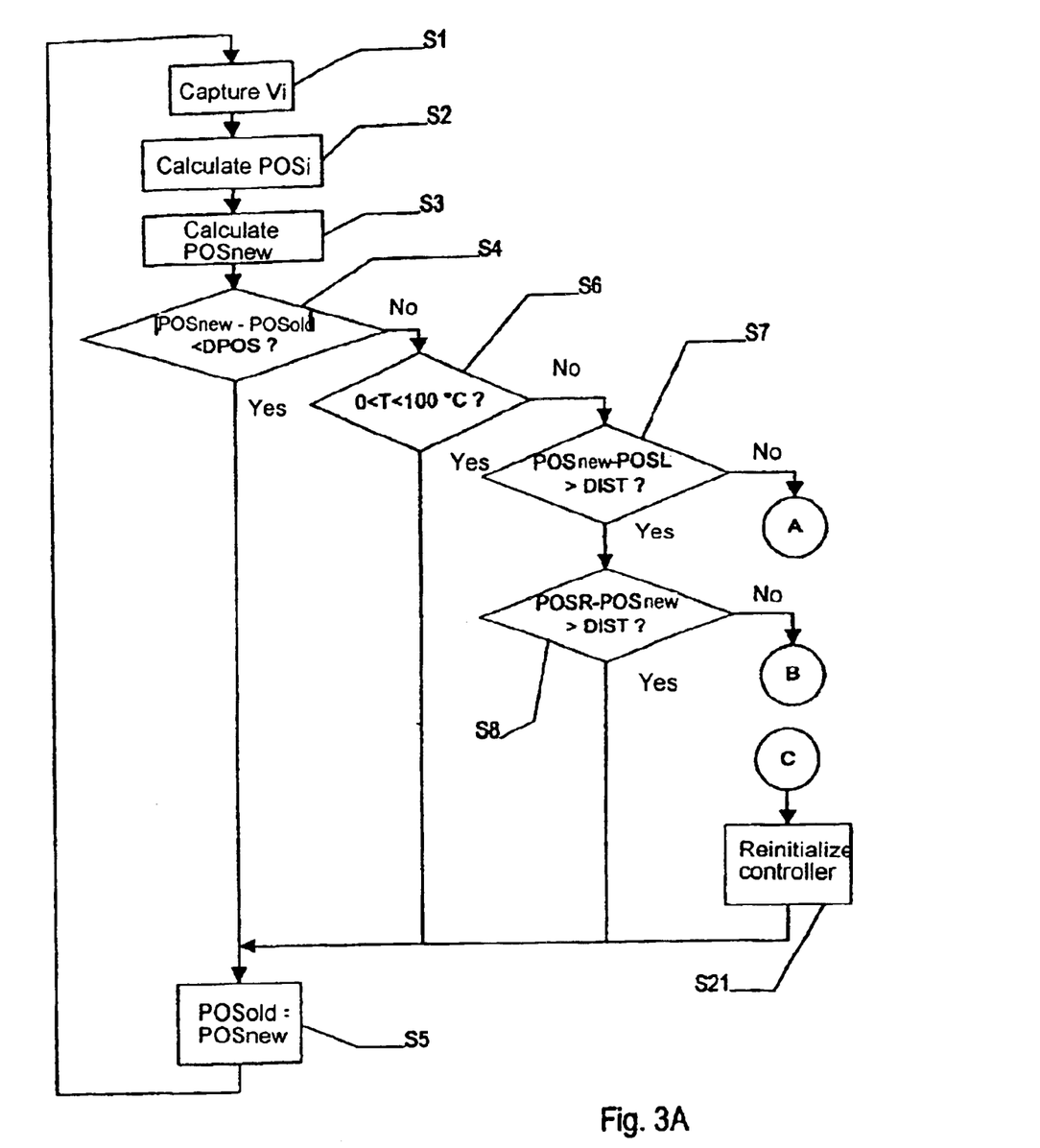

In FIG. 3A the actual method for controlling the setting of the flap 7 is shown in the form of an outline diagram in which steps that are not important for the detailed explanation of the invention are not depicted with great precision. The control method runs iteratively.

First in step S1 the actual value Vi of the voltage drop in the rotary rheostat 9 is captured.

Then in step S2 an actual value POSi for the setting of the flap 7, and corresponding to the actual value Vi, is determined with the aid of the characteristic curve shown in FIG. 2. This process uses the above-specified representation of the characteristic curve, which is derived from the general functional form of a linear function and from the values of the variables VR, POSR, VL and POSL stored in the control device 6.

This is followed by step S3 in which a set value POSnew for the setting of the flap 7 is determined on the basis of the actual value POSi as a function of other basically known parameters which are not important for the description of the invention, and the servomotor 8 is driven accordingly so that if the set value changes the setting of the flap 7 is changed.

The steps which follow are used to determine whether an adaptation of the characteristic curve needs to be carried out.

In step S4 a check is made to determine whether the rate of change of the set value POSnew for the setting of the flap 7 exceeds a given threshold value. For this the amount of the difference between the new set value POSnew and the set value POSold determined on the previous iteration is calculated and compared with a value DPOS corresponding to the product of the given threshold value for the rate of change and the maximum time required for an iteration, i.e. to run through steps S1 to S8. If the value of the amount determined is greater than DPOS, the method continues with step S5, in which the latest set value POSnew for the setting of the flap 7 is assigned to the variable POSold. The method then continues at step S1 without interrupting the regulation.

If however step S4 determines that the amount of the difference is smaller than the value DPOS so that the rate of change of the set value POSnew for the setting of the flap 7 is less than the given threshold, step S6 checks whether the temperature T of the exhaust gas in the exhaust gas duct 3 captured by the temperature sensor 10 lies in a given temperature range between 0° and 100° C. If this is the case, there is no occasion to assume that an adaptation of the characteristic curve is necessary, and the method continues with step S5 without interrupting the regulation.

If this is not the case, steps S7 and S8 check the criteria regarding closeness to an adaptation setting.

According to this embodiment of the method to which the invention relates, both the end positions of the flap 7 are used for adaptations and the values POSL or POSR are assigned to these positions for the settings.

If step S6 detects that the temperature is not in the given range, step S7 checks whether the new set value for the setting is outside a given separation DIST from the value POSL for the adaptation setting.

If this is the case, step S8 checks whether the new set value for the setting is also outside a given separation DIST from the value POSR for the adaptation setting. If it is determined that this condition applies, the method continues with step S5 without interrupting the regulation or carrying out an adaptation. In this case the set value for the setting is too far away from the value for one of the adaptation settings, so that the flap 7 would need to be moved through a wide angular range to one of the adaptation settings, requiring the regulation to be interrupted for a comparatively long time.

Figure 3B:
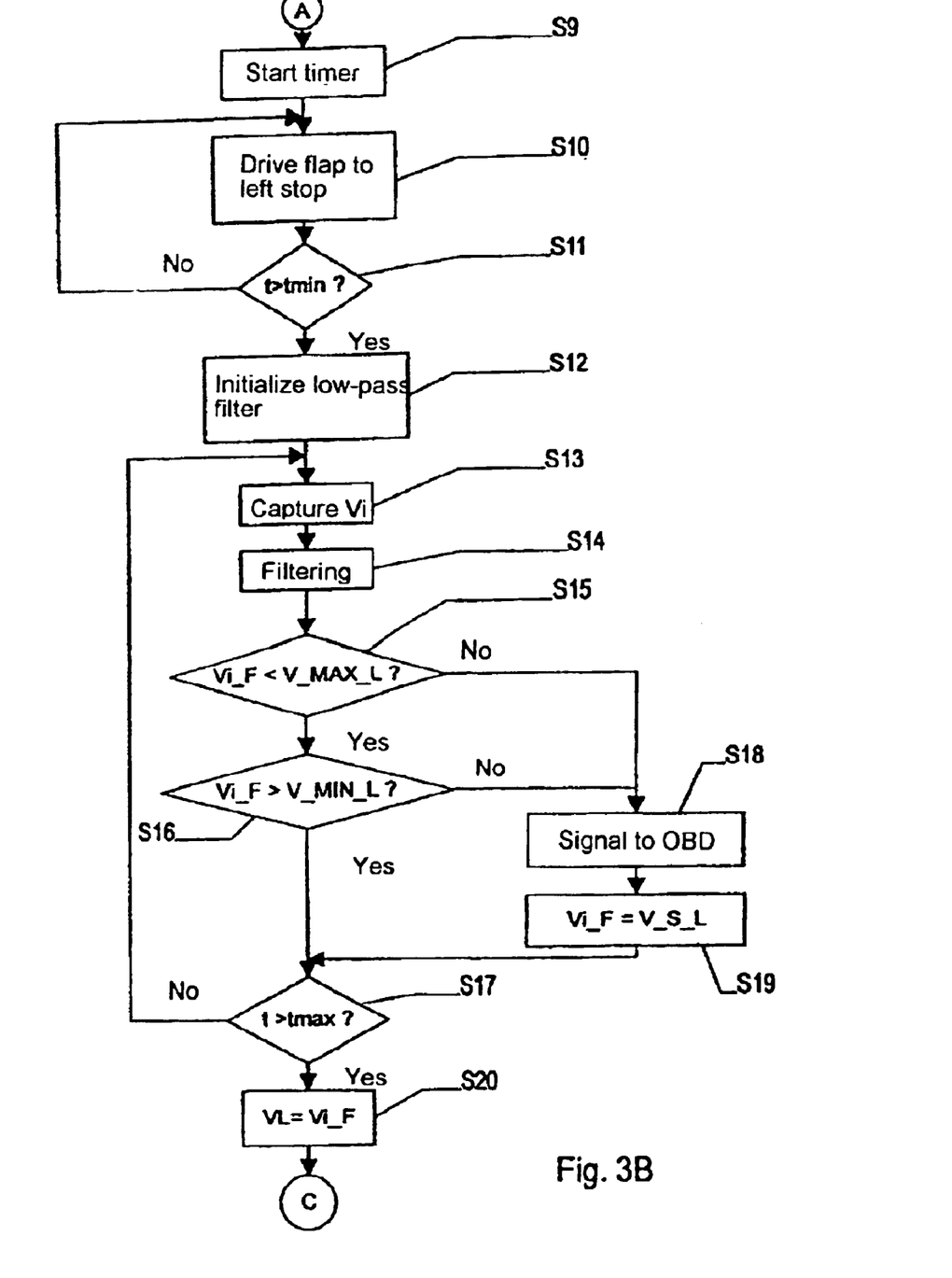

If step S7 determines that the set value for the setting lies sufficiently near to the value POSL for the adaptation setting, the adaptation method mainly depicted in FIG. 3B is carried out, and the actual regulation of the setting of the flap 7 which runs in steps S1 and S2 is interrupted.

Since the adaptation is performed only for a certain length of time, a timer contained in the control device 6 and not shown in FIG. 1 is started in step S9. When using a digital controller, this timer may be amongst other things a simple counter incremented in time with the digital controller.

Moreover in step S10 the servomotor 8 is driven so that the flap 7 is moved at a given speed of rotation towards the left stop for the left adaptation setting.

Whilst the flap 7 is being moved step 11 checks the current time of the timer to find out whether a minimum time tmin has been exceeded. If this is not the case, the rotation of the flap 7 by the servomotor 8 continues. For this purpose the length of the time tmin is chosen so that it is enough to allow the flap 7, at the chosen speed of rotation of the servomotor 8 in the context of the expected deviations from the characteristic curve, to be reached in every case, the flap 7 being if necessary pressed against the left stop for a certain amount of time by the servomotor 8. In this way it can be largely guaranteed that at the end of the time tmin the flap will actually be at the left stop.

If the time tmin is exceeded, a low pass filter for voltage values Vi for the voltage drop in the rotary rheostat 9 in the control device 6, captured during the adaptation, is initialized in step S12. This low pass filter determines in the main a floating, weighted average across two time steps.

Step S13 captures the voltage value Vi for the actual resistance of the rotary rheostat, corresponding to the position of the flap 7, and step S14 subjects this voltage value to a filtering process in the low pass filter, forming a filtered voltage value Vi_F.

In steps S15 and S16 this filtered voltage value Vi_F is then subjected to a plausibility check. This examines whether the filtered voltage value Vi_F lies within a tolerance range specified by the manufacturer of the exhaust gas recirculation valve.

To be more precise, step S15 checks whether the filtered voltage value Vi_F is less than an upper tolerance value V_MAX_L for the left stop, and step S16 checks whether the filtered voltage value Vi_F is greater than a lower tolerance value V_MIN_L for the left stop.

If both conditions are fulfilled, step S17 checks whether a given maximum time period tmax for the adaptation has been exceeded. If this is not the case, a voltage value Vi is captured again and steps S14 to S16 are then repeated.

If one of the conditions is not fulfilled, step S18 sends the diagnostic system 11 (OBD) a signal which is characteristic of the error that the voltage value at the left stop lies outside the tolerance range.

Then in step S19 the filtered voltage value Vi_F is set to a given substitute value V_S_L for the left stop, so that the control method can then continue on the basis of a meaningful substitute characteristic curve given by the substitute value.

If step S17 detects that the maximum time tmax envisaged for adaptation has been exceeded, then in step S20 the latest value Vi_F is used as the adaptation value and the voltage value VL for the left stop is set to this adaptation value and saved. This value is then used in the linear equation for the characteristic curve, which has now been adapted.

It is clear that steps S15 and S16 need not be executed in this sequence or consecutively. In particular a digital circuit with an OR gate can be used for checking the plausibility condition.

Once this adaptation is completed the integral action of the controller or control method is reinitialized, at which point the normal control method is resumed at step S5.

Figure 3C:
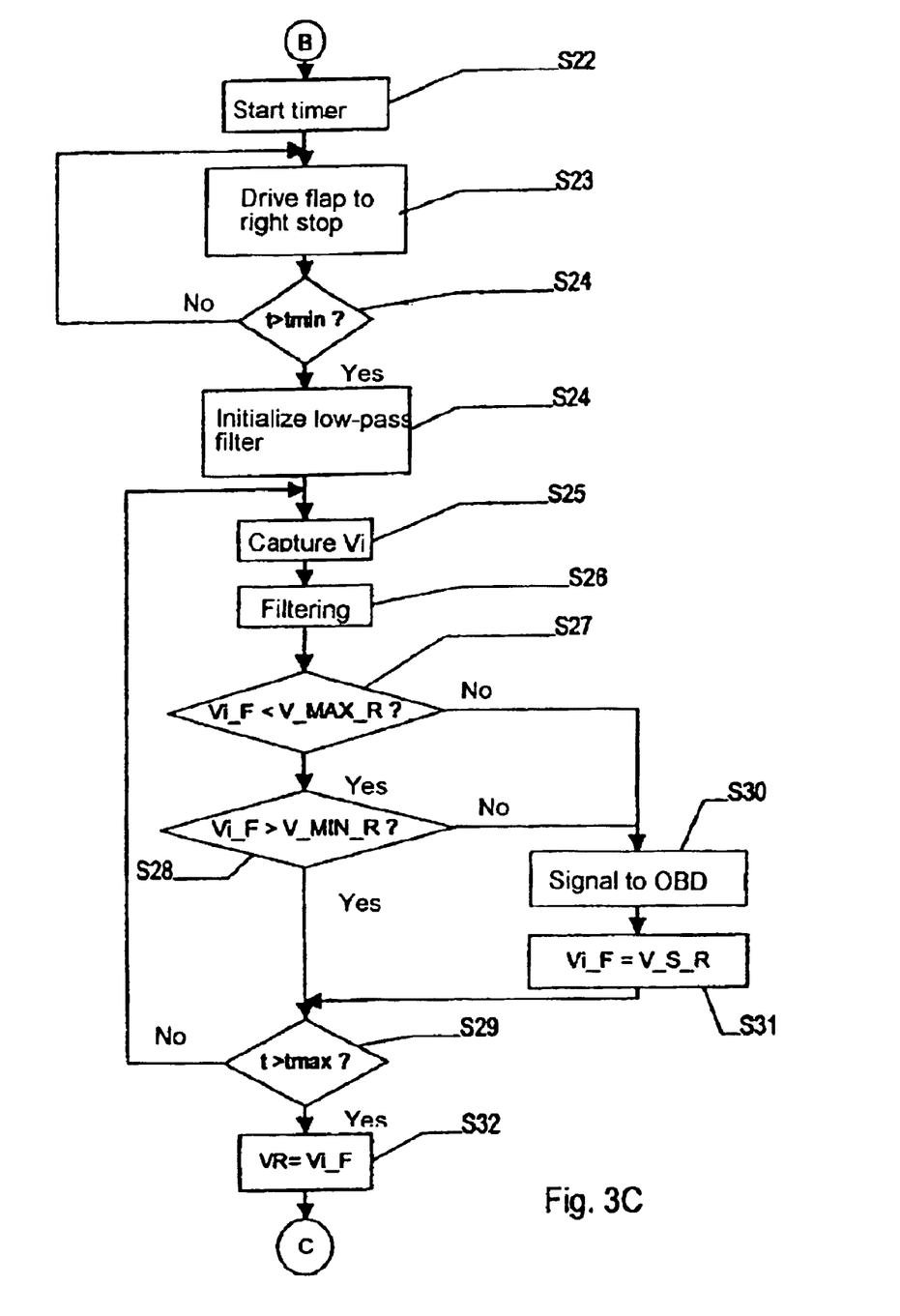

If step S8 finds that the set value for the setting is sufficiently close to the value POSR for the right adaptation setting, it executes the adaptation method outlined in FIG. 3C, during which the setting regulation carried out largely in steps S1 and S2 is interrupted. The characteristic curve adaptation illustrated in FIG. 3C for the right stop is largely the same as the characteristic curve adaptation illustrated in FIG. 3B for the left stop. In particular, steps S22 to S31 equate to steps S9 to S20, though the tolerance range limits V_MIN_L and V_MAX_L for the voltage value at the left stop are replaced by corresponding tolerance range limits V_MIN_R and V_MAX_R for the voltage value at the right stop. In addition the signal to the diagnostic system is suitably modified so that the diagnostic system can determine whether the error has occurred at the left or right stop. Lastly in the event of an error the substitute value V_S_R is used as the substitute value for the filtered voltage value instead of substitute value V_S_L.

The described control method according to a preferred embodiment of the invention makes it possible not only to adapt the characteristic curve when the internal combustion engine 1 is operating, whilst ensuring the shortest possible interruption to the regulation controlling the setting of the exhaust gas recirculation valve 5, but also to detect the occurrence of errors by means of the error signals sent to the diagnostic system, at the same time providing a substitute value as the adaptation value, enabling the setting regulation to continue to function.

We claim:

1. A control device comprising:
    a setting device, comprising a device for reporting the setting, which is regulated in a range between two end positions by using a measured parameter, given by the device for reporting the setting depending on the setting of the setting device, and a characteristic curve,
    means for assigning an actual value for the setting to each value of the measured parameter, in order to reach a set value for the setting,
    means for monitoring during regulation the set value or the actual value for the setting, and
    means for adapting, which, when the set value or the actual value for the setting lies within a given separation from a given value for an adaptation setting, adapt the characteristic curve by
        interrupting regulation,
        driving the setting device to the adaptation setting,
        in the adaptation setting capturing a value of the measured parameter and using this value to define an adaptation value and
        adapting the characteristic curve by using the adaptation value and the adaptation setting.

2. A control method comprising the steps of:
    regulating the setting for a setting device, comprising a device for reporting the setting, in a range between two end positions by using a measured parameter, given by the device for reporting the setting depending on the setting of the setting device, and a characteristic curve,
    assigning an actual value for the setting to each value of the measured parameter, in order to reach a set value for the setting,
    monitoring during regulation the set value or the actual value for the setting, and
    when the set value or the actual value for the setting lies within a given separation from a given value for an adaptation setting, adapting the characteristic curve by
        interrupting regulation,
        driving the setting device to the adaptation setting,
        in the adaptation setting capturing a value of the measured parameter and using this value to define an adaptation value and
        adapting the characteristic curve by using the adaptation value and the adaptation setting.

3. The method according to claim 2, wherein during regulation the fulfillment of at least one further condition relating to the regulation is monitored, and the characteristic curve is only adapted when the condition is fulfilled.

4. The method according to claim 3, wherein the change over time in the set value for the setting or the actual value for the setting is monitored, and in that adaptation of the characteristic curve is only carried out when the length of time over which the set value or actual value changes is less than a maximum value.

5. The method according to claim 2, wherein a setting device is designed so that its setting cannot be changed beyond at least one of the end positions, and in that this end position of the setting device is used as the adaptation setting.

6. The method according to claim 5, wherein the point at which the adaptation setting is reached is determined by monitoring the current consumption of an electrically operated driving device which is part of the setting device.

7. The method according to claim 5, wherein the value of the measured parameter is acquired after a given length of time following an interruption to the regulation, and wherein the point at which the adaptation setting is reached is determined by monitoring the current consumption of an electrically operated driving device which is part of the setting device.

8. The method according to claim 2, wherein the value of the measured parameter is acquired after a given length of time following an interruption to the regulation.

9. The method according to claim 2, wherein the characteristic curve can be represented as a function which can be allocated parameters by one or two pairs of mutually assigned adaptation values of the measured parameter and the corresponding value for the adaptation setting.

10. The method according to claim 2, wherein the measured parameter value captured in the adaptation setting is subjected to a plausibility check, and in that if an implausible value is detected a signal to that effect is sent to a diagnostic device.

11. The method according to claim 10, wherein the plausibility check examines whether the measured parameter value captured in the adaptation setting lies within a given value range.

12. The method according to claim 11, wherein if an implausible measured parameter value is detected, a given substitute value is used instead of the captured value.

13. The method according to claim 10, wherein if an implausible measured parameter value is detected, a given substitute value is used instead of the captured value.

14. The method according to claim 2, wherein the adaptation values from a plurality of adaptation processes are used for the purpose of error diagnostics.

15. The method according to claim 2, wherein the value of the measured parameter in the adaptation setting is captured a plurality of times and the adaptation value of the measured parameter is formed by filtering the captured values.

16. The method according to claim 2, wherein an integrating element of the control method is reinitialized when the regulation is resumed.

17. The method according to claim 2, wherein the setting of an exhaust gas recirculation valve in an internal combustion engine is regulated by a method in which the setting device drives an exhaust gas recirculation valve.

* * * * *